Dec. 23, 1969 J. J. HREN 3,486,020
FIELD ION OR FIELD EMISSION MICROSCOPE HAVING A
FIBER OPTIC FACE PLATE
Filed April 24, 1967 3 Sheets-Sheet 1

INVENTOR.
JOHN J. HREN
BY
Woodhams, Blanchard & Flynn
ATTORNEYS

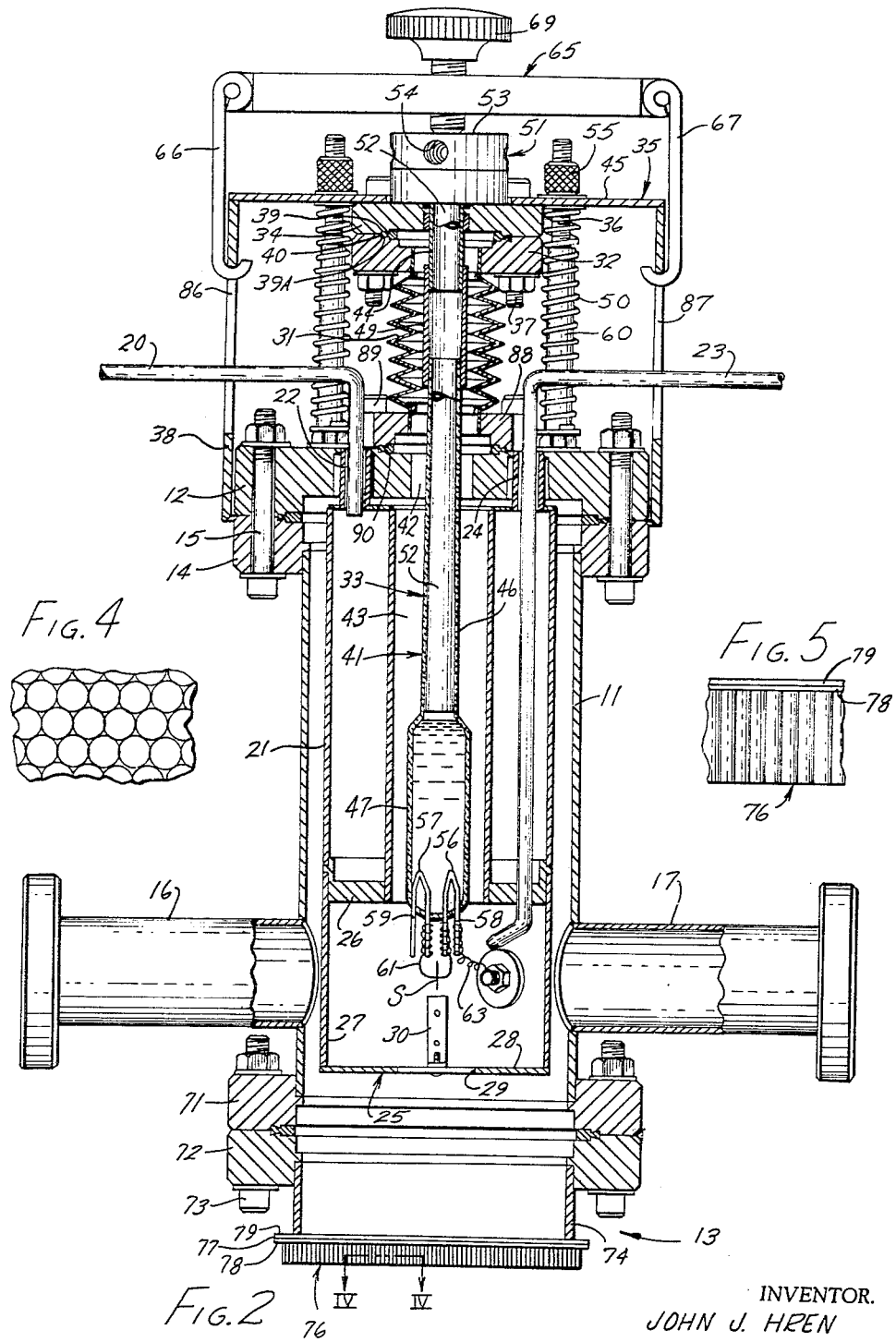

Dec. 23, 1969   J. J. HREN   3,486,020
FIELD ION OR FIELD EMISSION MICROSCOPE HAVING A
FIBER OPTIC FACE PLATE
Filed April 24, 1967   3 Sheets-Sheet 3

INVENTOR.
JOHN J. HREN
BY
Woodhams, Blanchard & Flynn
ATTORNEYS

United States Patent Office 3,486,020
Patented Dec. 23, 1969

3,486,020
FIELD ION OR FIELD EMISSION MICROSCOPE
HAVING A FIBER OPTIC FACE PLATE
John J. Hren, Gainesville, Fla., assignor to Jackson and
Church Electronics Company, Inc., Satellite Beach, Fla.,
a corporation of Florida
Filed Apr. 24, 1967, Ser. No. 633,115
Int. Cl. H01j 37/26
U.S. Cl. 250—49.5                              17 Claims

ABSTRACT OF THE DISCLOSURE

A field ion or field emission microscope having a fiber optic face plate in direct contact with a phosphor screen for transmitting images formed on the screen. The specimen is mounted on an inner assembly which can be tilted with respect to the screen and can be moved toward and away from the screen. The inner assembly and the specimen zone are surrounded by a Dewar and a radiation shield assembly. The imaging gas supply conduit extends through the Dewar.

---

This invention relates to improvements in field ion and field emission microscopes and, more particularly, relates to the use of a fiber optics window fitted to a field ion or a field emission microsope to permit the use of direct contact photography for recording the image or to permit recording of the image by an image orthicon or similar device.

A field ion microscope is the most powerful microscopic device known today. It is the only instrument that can show directly the atomic structure of a specimen and atomic lattice defects. The principle of the field ion microscope is that a high positive potential is applied to the substantially hemispherical tip of a polished metal wire or whisker in the presence of a small quantity of an imaging gas. A phosphor-coated screen is placed opposite the specimen tip and is connected to ground. When a sufficiently high positive potential, usually 5 to 30 kv., is applied to the specimen tip, gas atoms near the surface of the tip are ionized and the ions are projetced substantially radially outwardly from the specimen tip surface and in a direction substantially normal to said surface. The ions follow the electrostatic lines of force from the specimen and, although they do not, strictly speaking, move radially from the specimen, their movement at least is quite close to a radial movement. The ions strike the phosphor-coated screen to form an image thereon. Magnifications of up to several million diameters and a resolution of as small as two or three Angstrom units can be obtained. A cryostat is provided for cooling the specimen to liquid nitrogen temperature or below. A vacum system is provided to remove undesirable gaseous impurities and a controlled source of pure imaging gas, usually helium or neon, is provided.

The theory of operation of field ion microscopes and the significance of certain operating variables have been extensively discussed in the literature and need not be repeated here. It should suffice to point out that the imaging gases used are substantially inert (except for hydrogen which is a special case) and have high ionization energies so as to improve resolution. The potential applied to the specimen and the size of the specimen are selected so as to achieve a field sufficient to ionize the imaging gas as effectively as possible and the the thermal energies of the imaging gas and the specimen itself are maintained as low as possible, all for the purpose of improving resolution.

One additional factor that is significant in obtaining the best results from a field ion microscope is image recording and the present invention is particularly concerned with this. Heretofore, image recording has been done by using a 35 mm. camera with a very large lens (low $f$ number, such as $f/1$ or less) and the fastest film speeds obtainable consistent with acceptably small grain size. This is necessary because of the extremely low light level of the image produced on the phosphor screen. Even with such equipment, however, exposure times of the order of minutes are often required. Attempts have been made to use external and internal image intensifiers to give greater image brightness. Although this can be accomplished, all known methods either cause a loss of resolution or involve greatly increased equipment costs. Thus, the final photographic prints suffer from coarseness or poor peak-to-background intensity ratios either because of the very fast films employed (which are very coarse-grained) or because of the intensification process before photography.

Since most of the information useful to research personnel from a field ion miscroscope is visual in character, the ability of the field ion miscroscope to resolve or not to resolve atom images in particular regions of the photomicrography is crucial to the effectiveness of the field ion microscope as a research tool. Therefore, it is of very great importance to provide improvements in the optical systems of the field ion miscroscopes in order to obtain the maximum resolution in the photographs.

As will be apparent from the foregoing discussion, it has been possible to take photographs of the screen only at selected intervals and using relatively long exposure times or, alternatively, to lose substantial resolution by using those image intensifiers which are feasible to date. In order to form a stable field ion image, the potential applied on the specimen must be maintained below a certain level at which field evaporation begins and the specimen begins to disintegrate. It is often desired, however, to carry out controlled field evaporation studies in order to investigate the underlying structure of the specimen. Thus, in such cases it is desired to record field ion images after the successive evaporation of only a few atoms at a time so as to obtain a record of the three-dimensional structure of the specimen. Although this can be done by the prior apparatuses, it is either a very tedious and time-consuming procedure or an expensive procedure, and the resolution leaves much to be desired in any case. It is desired therefore to be able to obtain continuous visual records of high resolution during controlled field evaporation studies of specimens and the present invention is capable of doing this.

Further, the prior field ion miscroscope designs have not been well adapted for use with an image orthicon or similar device which is capable to translating the visual image into an electrical signal which in turn can be used in various ways, such as for television viewing of the reproduced image, magnetic tape recording and/or digitalization of the signal for coupling to a computer. Further, such an electrical signal can be intensified in order to improve the results.

Referring now to further improvements in field ion miscroscopes to which the present invention also relates, existing field ion microscope designs are relatively complex and, as a result, are lacking in the desired reliability. In addition, the prior field ion microscope designs suffer from a number of additional defects, among which may be mentioned the following:

(1) It is not possible to mount, adjust the position of, or remove the specimen easily and conveniently.

(2) The mechanisms provided for supporting the specimen and for providing a radiation shield for the specimen support and the cooling assembly are complex and expensive and improvement thereof is desired.

(3) The cryogenic liquids required are expensive and it is accordingly desired to minimize the amounts required.

(4) Special procedures must be taken to cool the imaging gas.

(5) Special flange constructions are provided in order to permit baking out of the field ion microscope in order to remove contamination.

(6) The structure provided for maintaining the specimen and gas at a low temperature is not as effective as desired.

(7) An excessive number of vacuum joints or seals are provided which make it difficult and/or time consuming to use the prior field ion microscope designs.

(8) The designs of the prior field ion microscopes are relatively rigid and they cannot be adjusted to perform all of the desired experimental procedures that may be required without requiring substantial, expensive and time-consuming alteration of the apparatus.

(9) The distance of the specimen from the phosphor screen cannot be altered and the specimen cannot be tilted whereby it is not possible to examine different locations on the specimen or to obtain photomicrographs of different locations on the specimen or to enlarge or diminish the area of the specimen being photographed.

Although the foregoing discussion has referred to field ion microscopes, it will be understood that it also applies to field emission microscopes. A field emission microscope employs the same basic arrangement of parts as a field ion microscope. However, a negative potential is applied to the specimen and no imaging gas is employed so that the image produced relates to the electronic structure of the surface layer of the specimen, rather than to the atomic structure of the surface. Thus, the present invention also is applicable to field emission microscopes.

Accordingly, it is an object of this invention to provide an improved field ion or field emission microscope construction which utilizes means capable of providing improved resolution whereby the image can be recorded by direct contact photography procedures in order to obtain high quality photomicrographs of the atomic structure or electronic structure of specimens or the image can be continuously scanned and projected by an image orthicon or a similar device in conjunction with a closed circuit television system and magnetic tape recording.

It is a further object of this invention to provide an improved field ion or field emission microscope construction, as aforesaid, which utilizes a fiber optics window for transmitting the image formed on a phosphor screen to the exterior of the device whereby photographs may be made of same.

It is a further object of the invention to provide a microscope construction, as aforesaid, which will be adaptable for use with either a horizontal or a vertical screen whereby to obtain the maximum of flexibility in the use of photographic or other recording means therewith.

A further object of the invention is to provide a microscope construction, as aforesaid, wherein with ordinary photographic equipment, photographs may be made with sufficiently short exposure time that a series of still pictures may be made of the development of a progressive operation or that motion pictures may be made of such operation.

A further object of the invention is to provide a microscope construction, as aforesaid, which will be adaptable for use with means reproducing the image provided by said microscope in a form for visual interpretation, such as projection onto a kinescope screen, said screen being either adjacent or remote from said microscope.

A further object of the invention is to provide a microscope construction, as aforesaid, in which the visual image can be scanned by an image orthicon or similar device so that the image can be translated into an electrical signal which can be intensified if desired and which can be transmitted to a television system, and/or can be recorded on magnetic tape, and/or can be digitalized for coupling to a computer.

It is a further object of this invention to provide an improved field ion or field emission microscope construction which is substantially improved as compared with previous field ion or field emission microscope constructions, particularly as regards the undesirable features referred to above.

Other objects and advantages of this invention will become apparent to persons acquainted with equipment of this type upon reading the following description and inspecting the accompanying drawings.

In the drawings:

FIGURE 2 is a central cross-sectional view through the field ion microscope of FIGURE 1.

FIGURE 4 is a fragmentary view taken along IV—IV of FIGURE 2.

FIGURE 5 is a view on an enlarged scale of a fragment of FIGURE 2.

Detailed description

Figure 1:
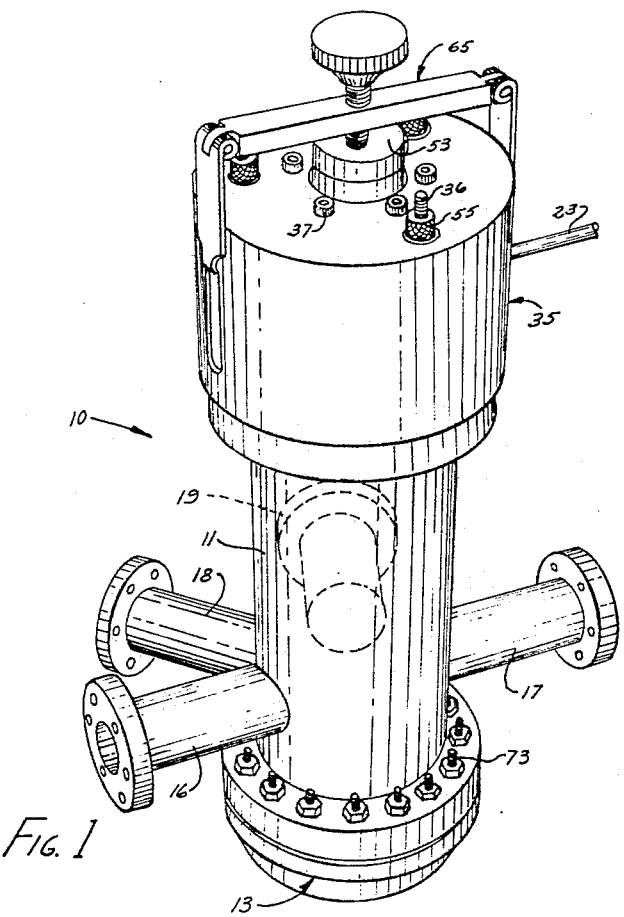
FIGURE 1 is a perspective view of a field ion microscope embodying the invention.
Figure 3:
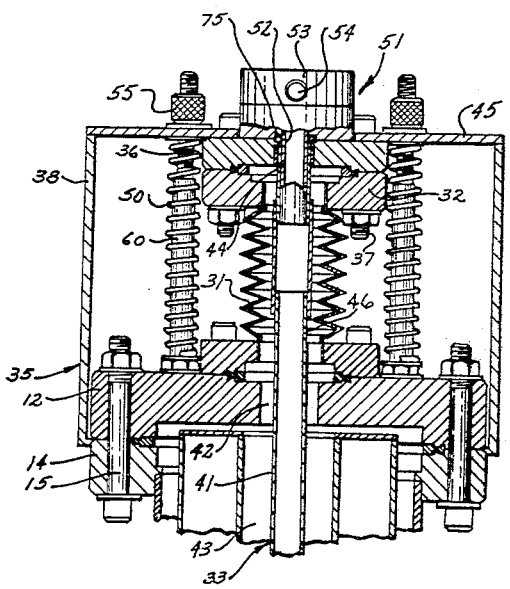
FIGURE 3 is a central sectional view, on an enlarged scale, of the upper end of the field ion microscope of FIGURE 1 and taken at right angles to FIGURE 2.

Referring to the drawings, there is shown a field ion microscope 10 which is comprised of a cylindrical casing 11 having a radially extending flange 14 at its upper end. A cover 12 is secured to the flange 14 by a plurality of bolts 15. The lower end of the casing 11 is closed by an optics assembly 13 described in greater detail hereinbelow. Conduits 16, 17 18 and 19 extend radially from the casing and communicate with the interior thereof for the reasons to be pointed out in greater detail hereinbelow. The casing 11 preferably is made of stainless steel.

An annular cylindrical Dewar 21, preferably made of stainless steel, is coaxially disposed within the casing 11 in spaced relation to the side wall and to the upper cover 12. The Dewar 21 is adapted to contain a suitable liquified gas, such as liquid nitrogen. The liquified gas is supplied to the Dewar 21 through an inlet conduit 20 which conduit extends through a tubular fitting 22. A conduit 23 for supplying imaging gas extends through a tubular fitting 24, thence downwardly through the interior of the Dewar 21 and through the lower end thereof whereby a cooled imaging gas can be delivered to the zone around the specimen as hereinafter further described. The fittings 22 and 24 are secured, as by welding, to the cover and the Dewar 21 is suspended thereby from the cover 12. If the imaging gas is externally cooled or the operating conditions do not required intensive cooling thereof, the imaging gas conduit need not pass through the Dewar 21.

An annular plate 26 is secured, as by welding, to the lower end of the Dewar 21. The plate 26 preferably is made of stainless steel. The plate 26 has a radiation shield assembly 25 removably mounted thereon, as by a bayonet-type joint. The radiation shield assembly 25 is comprised of a cylindrical member 27, made of copper or aluminum, which is releasably secured to the plate 26 and extends downwardly therefrom. An annular plate 28 is secured by L-shaped brackets 30 to the lower end of the cylindrical member 27 and said plate has a central opening 29 which is coaxial with the central opening of the plate 26 and the central opening 43 of the Dewar 21. The lower plate 28 also is made of copper or aluminum. It will be noted that the upper plate 26, the lower plate 28 and the cylindrical shield 27 are in good heat conductive connection to the Dewar 21 so that they are maintained at a low tempertaure. Although the lower plate 28 is shown as being in electrically conductive contact with the cylindrical member 27, said plate could be electrically insulated from the cylindrical member so that a potential could be applied thereto. For example, a negative potential could be applied on the plate 28 for carrying out pulsed field evaporation studies. The radiation shield assembly 25, therefore, can be modified or adjusted in a variety of different ways in order to perform different experiments.

A flexible metal bellows 31 extends upwardly from the cover 12 of the casing 11. The lower end of the bellows 31 is secured, as by welding, to a radially extending mounting and sealing flange 88, which flange is secured to the cover 12 by bolts 89. The upper end of said bellows is secured, as by welding, to a radially extending mounting and sealing flange 32. Thus, the interior of the bellows is maintained at the same pressure as the interior of the casing 11 and it is so connected to the casing and to the flange 32 as to make it possible to maintain the appropriate vacuum within said casing. At the same time, the bellows 31 is capable of being compressed axially or tilted in order that the position of the flange 32 with respect to the casing 11 can be adjusted.

An inner assembly 33 is mounted on the flange 32 and extends through the bellows 31, thence through the central opening 43 in the Dewar 21 and into the space between the plates 26 and 28. The inner assembly 33 has a radially extending flange 34 which is secured in sealing relationship to the flange 32 by the bolts 37.

An inverted cup-shaped housing 35 has a top wall 45 which bears on the upper surface of flange 34 and is secured thereto by the bolts 37. The housing 35 has a downwardly extending cylindrical portion 38 which encircles the bellows 31. The diameter of the cylindrical portion 38 of the housing 35 is slightly greater than the diameter of the cover 12 so that the housing 35 can move vertically and tilt slightly with respect to said cover as hereinafter explained. The amount of clearance between the cylindrical portion 38 and cover 12 is exaggerated in the drawings for purposes of clarity. In one embodiment of the invention this clearance was .025 inch. A plurality, here three, of threaded rods or posts 36 are secured at their lower ends to the cover 12 and the upper ends of said rods extend through openings in the top wall 45 of the housing 35. Springs 50 are sleeved on the rods 36 and urge the housing 35 upwardly. Knurled nuts 55 are threadedly secured to the upper ends of the rods 36 to form an upper limit or stop against which the housing 35 will be urged by the springs 50. Spacer sleeves 60 are sleeved on the rods 36 inside of the springs 50 and the upper ends of said sleeves provide a lower limit or stop for the downward movement of the housing 35. Thus, by backing off or tightening knurled nuts 55, the orientation of the inner assembly 33 with respect to the casing 11 can be adjusted in order to displace the inner assembly 33 vertically with respect to the casing or to change slightly the inclination of the assembly with respect to the casing. The housing 35 has a pair of vertically extending slots 86 and 87 therein. The conduits 20 and 23 extend through the slots 86 and 87.

In installations in which an adjustment capability is not required, the bellows 31 can be replaced by a rigid tube (not shown) which is welded to the flanges 32 and 88. In such a case the rods 36 and associated parts perform no function.

The flanges 32 and 34 have opposing annular recesses which have opposed conical sealing edges 39 and 39A which are pressed into a flat copper gasket 40 to provide an effective seal. The flanges 32 and 34 in this embodiment are Varian Conflat flanges, as disclosed in Patent No. 3,208,758, and are capable of providing leak-free connections at vacuums below $10^{-11}$ torr. The flanges can be disassembled easily and can be reconnected in leak-free relationship without substantial difficulty. Flange 88 is sealingly connected to cover 12 by a similar seal 90.

The inner assembly 33 is comprised of a tubular structure 41 whose open upper end is secured, as by welding, to the flange 34 and which extends downwardly through the bellows 31, through a central opening 42 in the cover 12, thence through the central opening 43 in the Dewar 21. The lower end of the tubular structure 41 is located between the plates 26 and 28.

The upper portion 44 of the tubular structure 41 is made of a metal or alloy, such as Kovar, which has a coefficient of thermal expansion matching that of the lower portion 46 thereof, which lower portion is made of electric and heat insulative material, here glass. The two portions 44 and 46 are united to each other in this embodiment by a conventional glass-Kovar seal 49, but any suitable ceramic-metal seal can be used. The lower end of the lower portion 46 is enlarged to form a bulb 47. In use, the bulb 47 is substantially filled with a suitable cryogenic liquid, such as liquid hydrogen, neon or helium.

Although the cryogenic liquid can be introduced into the bulb 47 by directly transferring the same thereinto, it is particularly convenient to use a refrigerator device 51 for supplying the cryogenic liquid. The refrigerator device 51, for example, can be one of the type sold by Air Products and Chemicals, Inc., of Allentown, Pa., under the trademark Cryo-Tip. The refrigerator device 51 is comprised of an open-ended tube 52 which has a mounting flange structure 53 at its upper end. The tube 52 fits closely within the structure 41 but is slideable axially with respect thereto; thereby permitting easy insertion or removal, but minimizing conductive or convective heat leaks to the cryogenic liquid. The flange 53 is sealed to the flange 34 by O rings 75 and said flange 53 has ports 54 through which highly pressurized gas can be fed and allowed to expand within the bulb 47, as described below, to produce a cryogenic liquid. The refrigerator device 51 can be secured to the flange 34 by a suitable fastening device, such as a clamp 65. The clamp 65 has pivotal legs 66 and 67 having hooks at their lower ends which are receivable through the slots 86 and 87 and are adapted to engage the upper edges of said slots. The clamp also has a screw 69 which is engageable with the flange 53 to press it against flange 34.

Figure 7:
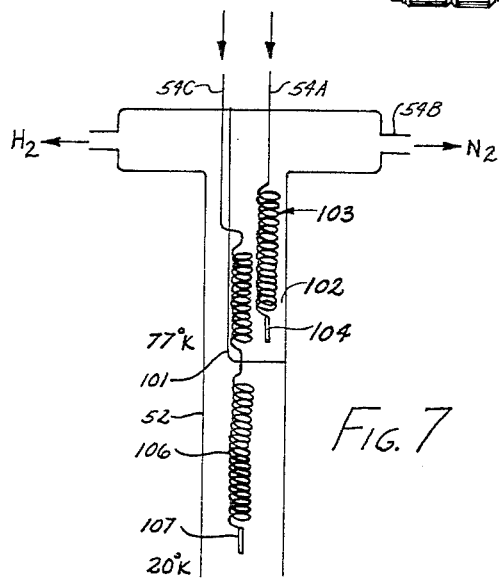
FIGURE 7 is a schematic view of the refrigerator device.

Referring to FIGURE 7, the refrigerator device 51 has an internal wall 101 within tube 52, which wall provides a nitrogen liquefaction chamber 102. Highly pressurized nitrogen gas, such as at a pressure of from 1000 to 1500 p.s.i., is supplied through a port 54A to coiled tubing 103 and said gas is discharged from said tubing into the chamber 102 through an expansion nozzle 104. The chamber 102 is at substantially atmospheric pressure. Because of the Joule-Thomson effect, liquid nitrogen becomes present in chamber 102. Nitrogen gas that forms in chamber 102 as the liquid nitrogen vaporizes is removed through port 54B. Highly pressurized hydrogen gas, such as at a pressure of from 600 to 1000 p.s.i., is supplied through a port 54C to coiled tubing 106 which extends through the chamber 102 and thence into the tube 52. The hydrogen gas is precooled to below its inversion temperature ($\sim 160°$ K.) as it passes through the chamber 102. Then it is discharged into tube 52 by passing it through an expansion nozzle 107. The tube 52 is at substantially atmospheric pressure. Because of the Joule-Thomson effect, liquid hydrogen becomes present in the tube 52 and bulb 47. Hydrogen gas that forms in the tube 52 is removed through port 54D.

A pair of tungsten leads 56 and 57 extend through the lower end of the bulb 47 so that they are in direct contact with the cryogenic liquid in said bulb. The tungsten leads 56 and 57 are sealed to the bulb by means of tungsten-glass seals of any suitable type. The leads 56 and 57 having adjacent depending legs 58 and 59. A support filament 61, which can be made of a suitable electrical and heat conductive material, such as Nichrome, is secured to the legs 58 and 59. The specimen S to be examined is secured by spot welding to the filament 61 between the depending legs 58 and 59 and extends downwardly between the plates 26 and 28 so that it is disposed in substantial coaxial alignment with the opening 29 in the plate 28.

The lead 56 has a further leg 62 which extends downwardly from the lower end of the bulb 47. A conductor 63 is connected to the leg 62 and is connected to the positive side of a suitable source of high potential whereby a high positive potential, such as 30 kv., can be applied to the specimen S. The conductor 63 extends through an opening in the cylindrical member 27 and thence out of the casing 11 through the conduit 19 (FIGURE 1). It will be noted that the high potential is applied only to the specimen S and said potential is insulated from the other parts of the microscope because the bulb 47 is made of electrically insulative material, here glass.

The conduit 17 is connected to a source of high vacuum whereby a vacuum is maintained within the casing 11 in accordance with conventional practice to remove gaseous impurities from the system.

It may be noted here that the vacuum system employed in the present invention and the structure of the system for supplying imaging gas to the interior of the casing can be selected in accordance with conventional practice. Accordingly, a detailed disclosure of these structural features is believed to be unnecessary.

Auxiliary equipment, such as an ionization gauge, can be connected by the conduit 18 to the interior of the casing for the usual purposes.

The casing 11 has a flange 71 secured to its lower end. The optics assembly 13 has a flange 72 which mates with and which is secured in vacuum sealing relationship to the flange 71 by bolts 73. The flanges 71 and 72 preferably comprise a Varian Conflat flange assembly as described above with reference to flanges 32 and 34. The flange constructions provided on the conduits 16, 17, 18 and 19 may advantageously also be Varian Conflat flanges of the same type as described above with reference to the flanges 32 and 34 and the flanges 71 and 72.

The optics assembly 13 is comprised of a cylindrical casing 74, preferably made of stainless steel, which is secured, as by welding, to the flange 72. A fiber optic face plate 76 is secured by a suitable glass-metal seal to the flange 77 at the lower end of the optics casing 74. A stannous oxide conductive coating layer 78 is applied to the inner surface of the face plate 76 to ground the hereinafter mentioned phosphor coating. The stannous oxide coating layer 78 is made as thin as possible, such as 100 angstrom units. This layer 78 is usually applied by a vapor deposition process. Further, a phosphor coating layer 79 is applied on the layer 78. The phosphor coating can, for example, be comprised of zinc silicate or zinc sulfide. The conductive coating layer 78 and the phosphor coating layer 79 can be provided in accordance with conventional designs and procedures in field ion microscopes and, hence, do not require detailed description.

The fiber optic face plate 76 is comprised of a multiplicity of small glass fibers or rods coated with a low refractive index material to insulate optically the rods against the environment and against each other. The face plate 76 is made as thin as possible consistent with the mechanical strength required to withstand the difference of pressures on the opposite surfaces of the face plate. The rods are arranged in an oriented (coherent) pattern and are stacked together and fused to form a solid block capable of transmitting a coherent image from one surface of the face plate to the opposite surface thereof. The rods are of as small a diameter as possible and ordinarily have a diameter of less than about 20 microns. The rods are oriented in parallel relationship so that the positions of both ends of each rod are identical on both surfaces of the face plate. Each rod transmits the light on one end thereof to the other end thereof so that a mosaic is transmitted from one surface to the face plate to the other surface thereof.

The specifications of a preferred fiber optic face plate 76 are as follows:

window diameter=10.8 cm.
thickness=7.6 mm.
individual fiber (rod) diameter=16 to 17 microns
numerical aperture=0.86

The diameter size of the fiber optic face plate makes it possible to use 10.1 cm. x 12.2 cm. photographic plates or sheet film, commonly known as 4 in. x 5 in. sheet film. Thus, since the visual information from the specimen which is formed on the phosphor coating is transmitted through the fibers comprising the face plate with a negligible loss in resolution, the image is still in focus on the outer surface of the face plate and may be recorded by direct contact photography. The fiber optic face plate can also be used for 35 mm. photography and for this purpose it has the advantage that precise positioning of the focal plane of the camera is not as critical as it is with conventional field ion microscopes not utilizing a fiber optic window. Relatively short exposure times are obtained even with slow, fine-grained films. For example, for the identical imaging conditions a contact negative using Panatomic-X sheet film rated at ASA 80 and a negative made through a Wray $f/1$ lens using 35 mm. Tri-X rated at ASA 1200 required the same exposure times. This is equivalent to an increased optical efficiency of a factor of about fifteen, i.e., for the same film speed a direct contact print with the fiber optic window would require only one-fifteenth the exposure time required for a 35 mm. camera with an $f/1$ lens. Contact negatives with the faster Tri-X sheet film give exposure times that are lower by at least a factor of 10. At much higher imaging voltages (25–30 kv.) the ultimate in fine-grained emulsions, i.e., metallographic plates, can be used with convenient exposure times. A more complete compilation of photographic exposure data for several films under various imaging conditions are given in Table I.

TABLE I.—COMPARATIVE PHOTOGRAPHIC DATA

| Material: | Imaging Conditions | | | | Time (min.) | Developing Time [2] (min.) | Exposure ASA Rating | Method of Exposure |
|---|---|---|---|---|---|---|---|---|
| | T.° K. | P$\mu$He | KV | Film [1] | | | | |
| NiMo | 16 | 1.5 | 30.0 | Metallographic plate | 5.0 | 5.00 | | Contact. |
| Pt | 20 | 5.0 | 15.0 | Tri-X Ortho | 2.0 | 6.25 | 1,200 | Do. |
| W | 16 | 3.5 | 8.6 | do | 2.0 | 10.00 | 2,400 | Do. |
| W | 20 | 1.0 | 13.2 | do | 2.0 | 6.25 | 1,200 | Do. |
| W | 20 | 1.0 | 13.2 | Royal Pan | 2.5 | 6.25 | 1,000 | Do. |
| W | 20 | 1.0 | 13.2 | Pan-X | 15.0 | 10.00 | 300 | Do. |
| W | 20 | 1.0 | 13.2 | Tri-X Pan 35 mm | 30.0 | 3.75 | 1,200 | Wray f./1 lens. |

[1] Film is 4″ x 5″ sheet film unless otherwise noted.
[2] All film processed in Acufine developer.

It will be understood that fiber optic face plates of different size can be used. For example, a face plate of smaller diameter and made of fibers of smaller diameter can be used.

Extreme blow ups of the photographs reveal no evidence of the fiber structure. Therefore, any graininess in a photomicrograph prepared in accordance with the present invention must be attributed to the grain size of the film, the paper or the phosphor itself.

It is particularly to be noted that the stannous oxide layer 78 and the phosphor layer 79 are applied directly on the inner surface of the fiber optic face plate 76. Insofar as I am aware, it has not been suggested previously to apply such layers directly onto a surface of a fiber optic face plate. However, this feature is of major importance in achieving a minimum loss of resolution of the image.

The face plate 76 preferably is horizontal and a mirror may be used to view the image during an experiment. The horizontal disposition of the face plate is advantageous because it simplifies the design of the cryogenic components, the photographic recording is easier, the design is safer and it provides for easy adjustment of the position of the specimen.

The position of the Dewar 21 surrounding the inner assembly provides an excellent radiation shield whereby a lesser amount of the more expensive cryogenic liquid is used in the inner assembly 33. Also since the imaging gas conduit passes through the Dewar 21, the gas is cooled effectively which is important to the achievement of high resolution because it reduces the thermal energy of the imaging gas ions and minimizes the angular spreading of the emitted ions.

The use of the Varian Conflat flanges permits the entire assembly to be baked out at temperatures up to 450 degrees C., if desired.

The radiation shield assembly 25 which is at liquid nitrogen temperature almost entirely surrounds the specimen whereby the specimen and the imaging gas are maintained at a low temperature. The radiation shield assembly 25 can be easily replaced by suitably modified shield assemblies since there are no vacuum joint or seals to be changed, whereby a variety of different experiments can be carried out. For example, the disc 28 can be arranged so as to bombard the specimen with various particles, such as ions or electrons, in order to carry out various experiments. Also, a getter can be placed inside the radiation assembly to achieve even better vacuum conditons. Moreover other devices, such as a laser for heating the specimen, may be focused through a small opening in the radiation shield assembly.

The inner assembly 33 can be adjusted to tilt the specimen so that the position being examined of the specimen can be changed. Also, the specimen can be moved toward and away from the face plate 76 to change the magnification.

The refrigerator device 51 can be easily removed which is desirable as such devices usually are not bakeable. Since it is independent of the microscope body it can be removed and used with other equipment.

Modification

Figure 6:
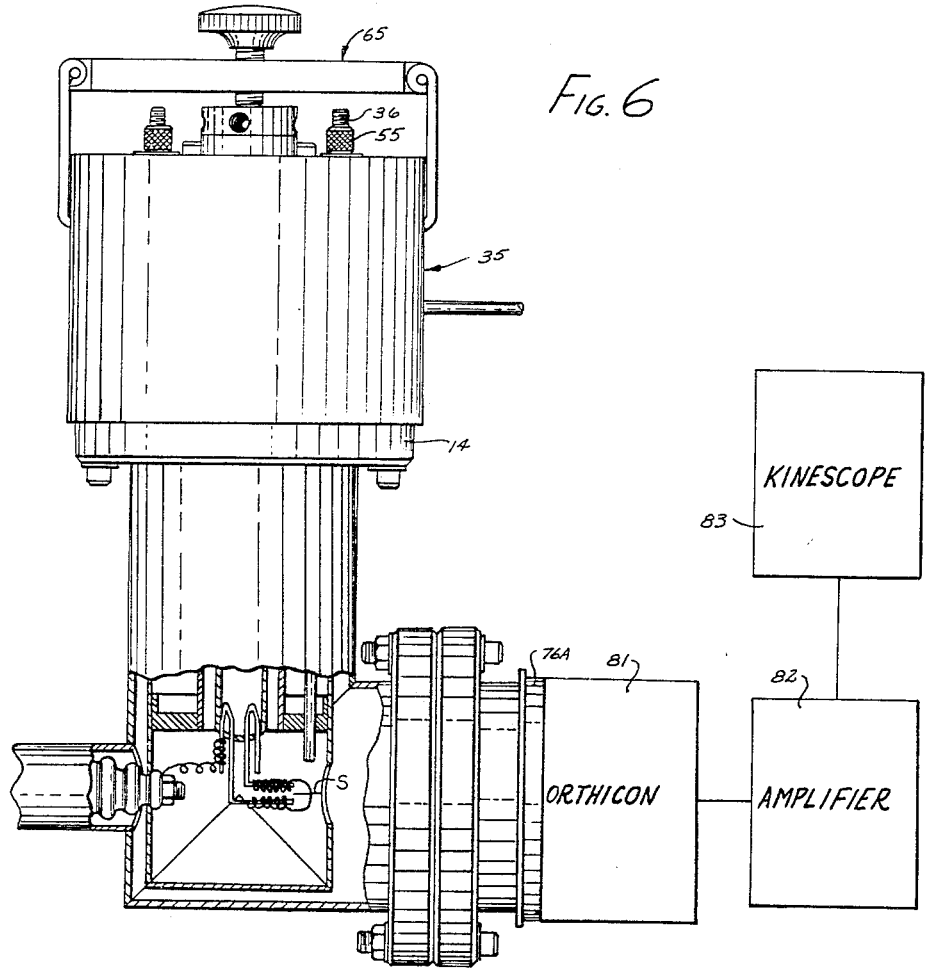
FIGURE 6 is a schematic view of a modification.

Referring to FIGURE 6, there is shown a modification in which the specimen is arranged so that the ions can be projected onto a vertically positioned fiber optic face plate 76A. This figure also discloses a further modification according to which the face plate 76A is arranged to form the photoemissive screen of an image orthicon 81. The remainder of the orthicon 81 can be of a conventional commercially available type. The voltages produced by scanning the screen by a beam of electrons from an electron gun are amplified by an amplifier circuit 82 of any suitable type and are transmitted to a kinescope 83 so that a visible display of the image on face plate 76A can be obtained. Also, the electrical signal can be recorded on magnetic tape. It will be apparent that the face plate 76 in the principal embodiment of the invention also can be arranged in conjunction with an orthicon. Furthermore, the visual information is thereby transformed to an electrical signal and can then be digitalized in conjunction with a suitable computer program.

Although particular preferred embodiments of the invention have been disclosed above in detail for illustrative purposes, it will be recognized that variations or modifications of such disclosure, which come within the scope of the appended claims, are fully contemplated.

The embodiments of the invention in which an exclusive property or privilege is claimed are defined as follows:

1. A microscope construction comprising a casing adapted to be held under a high vacuum, a specimen holder for holding a specimen within said casing, a phosphor screen arranged in opposing relation to and spaced from the specimen, means for establishing a high unidirectional potential difference between the specimen and the screen, means for supplying an imaging gas in the region around the specimen and cryogenic means for cooling the imaging gas and the specimen to low temperatures, characterized by the improvement that the phosphor screen is a phosphor layer applied directly on one surface of a thin conductive layer, the opposite surface of said conductive layer directly contacting and being adhered to an inwardly facing surface of a fiber optic face plate so that an image formed on the phosphor screen is transmitted with a minimum of distortion through the fiber optic face plate to the outwardly facing surface thereof.

2. The device defined in claim 1 wherein said thin conductive layer is comprised of stannous oxide.

3. The device defined in claim 1 wherein said face plate is positioned horizontally.

4. The device defined in claim 1 wherein said face plate is positioned at least substantially vertically.

5. The device defined in claim 1 including also iconoscope means associated with said face plate to produce an electrical output corresponding to the image on said face plate.

6. The device defined in claim 1 including also iconoscope means associated with said face plate to produce an electrical output corresponding to the image on said face plate and kinescope means coupled to said iconoscope means for converting said electrical output to a visual image.

7. The device defined in claim 1 including also iconoscope means associated with said face plate to produce an electrical output corresponding to the image on said face plate, kinescope means coupled to said iconoscope means for converting said electrical output to a visual image and an electrical amplifier positioned between said iconoscope means and said kinescope means.

8. A microscope construction according to claim 1, in which said conductive layer is comprised of stannous oxide and in which said fiber optic face plate is comprised of a multiplicity of rods of diameters of less than about 20 microns, said rods being insulated optically from the environment and each other, said rods being fused together to form a solid block with the rods being oriented in parallel relationship so that the opposite ends of each rod are positioned at the same locations on both surfaces of said face plate, said stannous oxide layer being applied directly onto the ends of said rods on one surface of said face plate.

9. A microscope construction according to claim 1, in which the opposite surface of said face plate forms the photoemissive screen of an orthicon, and a kinescope coupled to said orthicon for providing a visual display of the image formed on the said opposite surface of said face plate.

10. A microscope construction comprising a casing adapted to be held under a high vacuum, a specimen holder for holding a specimen within said casing, a phosphor screen arranged in opposing relation to and spaced from the specimen holder, means for establishing a high unidirectional potential difference between the specimen and the screen, means for supplying an imaging gas in the region around the specimen and cryogenic means for cooling the imaging gas and the specimen to a low temperature, characterized by the improvement:

a tubular member connected to said specimen holder and extending through an opening in said casing to a position outside of said casing, said opening being of larger size than said tubular member to permit tilting and lengthwise movement of said tubular member with respect to said casing, adjusting means between said casing and a portion of said tubular member outside of said casing for adjusting the position of said tubular member with respect to said casing, a flexible vacuum-tight bellows surrounding said portion of said tubular member, said bellows being secured at one end thereof in vacuum-tight relationship to said casing and the other end of said bellows being secured in vacuum-tight relationship to said portion of said tubular member.

11. A microscope construction according to claim 10, in which said adjusting means comprise at least three spaced-apart bolts extending between said portion of said tubular member and said casing.

12. A microscope construction comprising a casing adapted to be held under a high vacuum, a specimen holder for holding a specimen within said casing, a phosphor screen arranged in opposing relation to and spaced from the specimen holder, means for establishing a high unidirectional potential difference between the specimen and the screen, means for supplying an imaging gas in the region around the specimen and cryogenic means for cooling the imaging gas and the specimen to low temperature, characterized by the improvement that the cryogenic means comprises a Dewar and the means for supplying an imaging gas comprises conduit means extending through the Dewar.

13. A microscope construction according to claim 12, in which the Dewar is of annular cylindrical shape, the specimen holder comprising a tubular member extending through the central opening of said Dewar and said conduit means extends axially through the interior of said Dewar from one axial end to the other axial end thereof.

14. A microscope construction comprising:
a casing adapted to be held under a high vacuum;
an annular cylindrical Dewar mounted within said casing;
a radiation shield assembly extending from one end of said Dewar, said assembly comprising a side wall and an annular end plate at one end of said side wall, said radiation shield assembly defining a specimen zone of substantial size between said Dewar and said end plate, means for releasably securing said side wall to said Dewar and means for releasably securing said end plate to said side wall;
means for holding a specimen within said specimen zone;
a phosphor screen positioned outside of said specimen zone and opposed to the central opening of said annular end plate;
means for establishing a high unidirectional potential difference between the specimen and the screen; and
means for supplying an imaging gas to said specimen zone.

15. A microscope construction according to claim 14, in which said Dewar has a threaded end wall, said side wall being cylindrical and being threadedly engaged at one end thereof with said end wall, said side wall and said end plate also being threadedly engaged.

16. A microscope construction comprising:
an outer assembly comprising a casing having an optics assembly closing one end thereof and having an end wall closing the other end thereof;
an annular cylindrical Dewar disposed within and supported on said casing and extending from adjacent said end wall partway through said casing toward said optics assembly;
a cylindrical radiation shield assembly extending downwardly from the lower end of said Dewar and having an annular end plate which extends generally parallel with said optics assembly with the central opening of said end plate being coaxial with said optics assembly, said radiation shield assembly defining a specimen zone of substantial size between said one end of said Dewar and said end plate;
an imaging gas conduit extending downwardly through said Dewar and having its lower end located in said specimen zone;
an inner assembly mounted on said end wall of said casing, said inner assembly including a tubular member extending downwardly through the central opening in the Dewar and the lower end of said tubular member extending into said specimen zone, at least the lower portion of said tubular member being made of glass;
a pair of tungsten leads each having portions extending into the interior of said tubular member at the lower end thereof and being sealed thereto;
specimen mounting means secured to said leads and supported thereby below said tubular member and in alignment with said central opening of said end plate;
an electrical conductor connected to one of said leads and extending through an opening in said radiation shield assembly and an opening in said casing for connection to one side of a source of electrical potential, and insulating means surrounding said conductor and insulating same from said casing and said radiation shield assembly so that the potential is applied only to said lead and thereby to the specimen;
a conduit in communication with the interior of said casing for maintaining a vacuum therein;
a refrigerator device mounted on said inner assembly and comprising a pipe closely slideably received within said tubular member and extending from the upper end thereof partway to the lower end thereof, the lower end of said pipe being open, and means for supplying a cryogenic fluid to said pipe so that the lower end of said tubular member becomes filled with said cryogenic fluid;
means for adjusting said inner assembly upwardly and downwardly with respect to said casing and means for changing the inclination of said inner assembly with respect to said Dewar; and
said optics assembly comprising a multiplicity of glass rods which are optically isolated from each other, which are arranged in a coherent pattern and which are bonded together to form a unitary face plate capable of transmitting images on one surface of said face plate to the other surface thereof, said face plate extending across and closing off said one end of said casing, the interior surface of said face plate having a stannous oxide layer directly contacting and adhered to corresponding one end of said rods, and a phosphor layer applied directly on said stannous oxide layer whereby an image formed on said phosphor layer by electrical particle bombardment from the specimen will be transmitted through said rods so that a corresponding image is formed on the outer surface of said face plate.

17. A microscope construction comprising:
an outer assembly comprising a casing having an optics assembly closing one end thereof and having an end wall closing the other end thereof;
an annular cylindrical Dewar disposed within and supported on the casing and extending from adjacent said end wall partway through said casing toward said optics assembly;
an imaging gas conduit extending into the casing for supplying imaging gas into a specimen zone between said Dewar and said optics assembly;
an inner assembly mounted on said end wall of said casing, said inner assembly including a tubular member extending downwardly through the central opening in the Dewar with the lower end of said tubular member extending into the specimen zone;
specimen mounting means supported on the inner end of said inner assembly;
electrical conductor means connected to said specimen mounting means for applying electrical potential on a specimen;

a conduit in communication with the interior of said casing for maintaining a vacuum therein;

means for supplying a cryogenic fluid to said tubular member;

said optics assembly comprising a multiplicity of glass rods which are optically isolated from each other, which are arranged in a coherent pattern and which are bonded together to form a unitary face plate capable of transmitting images on one surface of said face plate to the other surface thereof, said face plate extending across and closing off said one end of said casing, the interior surface of said face plate having a stannous oxide layer directly contacting and adhered to corresponding one ends of said rods, and a phosphor layer applied directly on said stannous oxide layer whereby an image formed on said phosphor layer by electrical particle bombardment from the specimen will be transmitted through said rods so that a corresponding image is formed on the outer surface of said face plate.

References Cited

UNITED STATES PATENTS

| | | |
|---|---|---|
| 2,714,678 | 8/1955 | Wolff. |
| 3,086,112 | 4/1963 | Riecke. |
| 3,370,168 | 2/1968 | Komoda. |

OTHER REFERENCES

"Field Ionization and Field Ion Microscopy," by E. W. Muller from Advances in Electronics and Electron Physics, vol. 13, 1960, pp. 123–135.

"Image Converter Tube Photography," by J. S. Courtney-Pratt from April 1962 Journal of the SMPTE, vol. 71.

ARCHIE R. BORCHELT, Primary Examiner

S. C. SHEAR, Assistant Examiner